(12) United States Patent
Chen

(10) Patent No.: US 7,520,193 B2
(45) Date of Patent: Apr. 21, 2009

(54) BALL SCREW ASSEMBLY

(75) Inventor: Xin-He Chen, Taichung (TW)

(73) Assignee: Hiwin Technologies Corp., Taichung (TW)

( * ) Notice: Subject to any disclaimer, the term of this patent is extended or adjusted under 35 U.S.C. 154(b) by 557 days.

(21) Appl. No.: 11/370,270

(22) Filed: Mar. 6, 2006

(65) Prior Publication Data
US 2007/0204713 A1 Sep. 6, 2007

(51) Int. Cl.
*F16H 1/24* (2006.01)
*F16H 55/02* (2006.01)

(52) U.S. Cl. ............... 74/424.87; 74/424.86; 74/424.82

(58) Field of Classification Search .............. 74/424.86, 74/424.87, 424.88, 424.82; 384/43, 45
See application file for complete search history.

(56) References Cited

U.S. PATENT DOCUMENTS

| | | | | | |
|---|---|---|---|---|---|
| 2,851,897 | A | * | 9/1958 | Cochrane | 74/424.87 |
| 3,771,382 | A | * | 11/1973 | Wilke | 74/424.87 |
| 4,226,137 | A | * | 10/1980 | Sharp | 74/424.86 |
| 4,272,476 | A | * | 6/1981 | Benton | 264/225 |
| 5,069,088 | A | * | 12/1991 | Tanaka | 74/424.87 |
| 5,142,929 | A | * | 9/1992 | Simpson, III | 74/424.87 |

\* cited by examiner

*Primary Examiner*—Thomas R Hannon
*Assistant Examiner*—Justin Krause
(74) *Attorney, Agent, or Firm*—Charles E. Baxley

(57) ABSTRACT

A ball screw assembly, wherein the circulate component is positioned in the nut by inserting a protrusion in a notch, so that the circulate component is positioned easily, and the problem of assembly difficulty is solved. The method of fixing the circulate components in the nut is that: the circulate component is formed with an axial hole and the radial hole that are connected to each other, the axial hole of the circulate component is aligned to the axial locking hole of the nut, and then liquid resin is injected into the axial hole of the circulate components, and the liquid resin will form a locking members after curing, thus fixing the circulate component in the nut. Due to the formation of the locking member is determined by the diameter of the hole to be machined, the configuration of locking member will be varied in response to the diameter of the hole to be machined. Whatever the diameter of the hole to be machined changes or not, it will not affect the interchangeability of the locking member. Therefore, the production cost is saved since it doesn't need to prepare different sized locking members.

9 Claims, 8 Drawing Sheets

EPOXY SUPPLY

BALL SCREW ASSEMBLY

BACKGROUND OF THE INVENTION

1. Field of the Invention

The present invention relates to a ball screw assembly, and more particularly to an improved circulate component fixed in a nut of a ball screw assembly.

2. Description of the Prior Art

Referring to FIG. 1, which is an exploded view of a conventional ball screw, wherein the nut 6 is defined with rectangular recesses 6a for accommodation of the circulate components 7a and 7b. The circulate components 7a and 7b are fixed by screwing fixing members 8 through the fixing hole 7c of the circulate components and into the fixing holes 6b of the nut.

The assembly method of the conventional circulate component is to insert the circulate element directly in the rectangular recess, and the circulate component should be able to move back and forth before it is fixed, that is, the fixing hole in the circulate component must be aligned to the fixing hole of the nut in advance, facilitating the insertion of the fixing member through the circulate component and the nut. Therefore, this conventional assembly method is difficult to position the circulate component, making assembly difficult and increasing production cost. And these problems need to be improved.

In addition, the method of fixing the conventional circulate member also has its own problem, since the diameter of the fixing holes and the hole through which the nut passes determine the configuration of the fixing member, so if the diameter of the holes changes, the fixing member must be replaced in response to the changed diameter. Therefore, the fixing members have no interchangeability and commonality, and as a result, the fixing members must have many different specifications.

Hence, the problems of the conventional ball screw, the assembly difficulty and the interchangeability of the fixing member, have never been solved simultaneously.

The present invention has arisen to mitigate and/or obviate the afore-described disadvantages.

SUMMARY OF THE INVENTION

The primary objective of the present invention is to provide a ball screw assembly, and a method of installing and fixing the circulate component, which is capable of solving the assembly difficulty and the non-interchangeability of the fixing member simultaneously.

A ball screw assembly provided by the present invention comprises: a screw shaft, a nut, a plurality of balls, at least one circulate component and at least one fixing member, a helical groove formed in an outer surface of the screw shaft for engaging with the nut, the nut is hollow, and in its inner surface is formed a helical groove located opposite the helical groove of the screw shaft, thus forming a circulating path for the balls, the circulate component is disposed in the nut for enabling the balls to circulate in the circulating path, the ball screw assembly is characterized in that:

The nut 2 is defined with a plurality of circular holes 22 for installation of the circulate component 4, and the circular holes 22 are formed in an outer surface of the nut for insertion of the circulate components 4. An axial hole 42 and a radial hole 41 are connected to each other and are formed in the top portion 4a and the bottom portion 4b of each of the ciculate components 4, respectively. The axial hole 42 of the circulate components 4 is aligned to the axial locking hole 23 of the nut 2. The circulate components 4 are fixed in the nut 2 by locking members 5 that are formed by injecting liquid resin into the radial hole 41, so that the liquid flows to the axial hole 42 of the circulate components 2 and the axial locking hole 23 of the nut 2, and forms the locking members 5 after curing.

The method of positioning the circulate components in the nut is that: The top portion of the circulate component is formed with a protrusion for engaging with the notch in peripheral edge of the upper portion of the circular hole, so that the circulate component is positioned easily, and the problem of assembly difficulty is solved.

Regarding the method of fixing the circulate component in the nut, due to the formation of the locking member is determined by the diameter of the hole to be machined, the configuration of locking member will be varied in response to the diameter of the hole to be machined. Whatever the diameter of the hole to be machined changes or not, the interchangeability of the locking member will not be affected. Therefore, the production cost is saved since it doesn't need to prepare different sized locking members.

The present invention will become more obvious from the following description when taken in connection with the accompanying drawings, which show, for purpose of illustrations only, the preferred embodiments in accordance with the present invention.

DETAILED DESCRIPTION OF THE PREFERRED EMBODIMENTS

The foregoing, and additional objects, features and advantages of the present invention will become apparent from the following detailed description of preferred embodiments thereof, taken in conjunction with the accompanying drawings.

Figure 1:
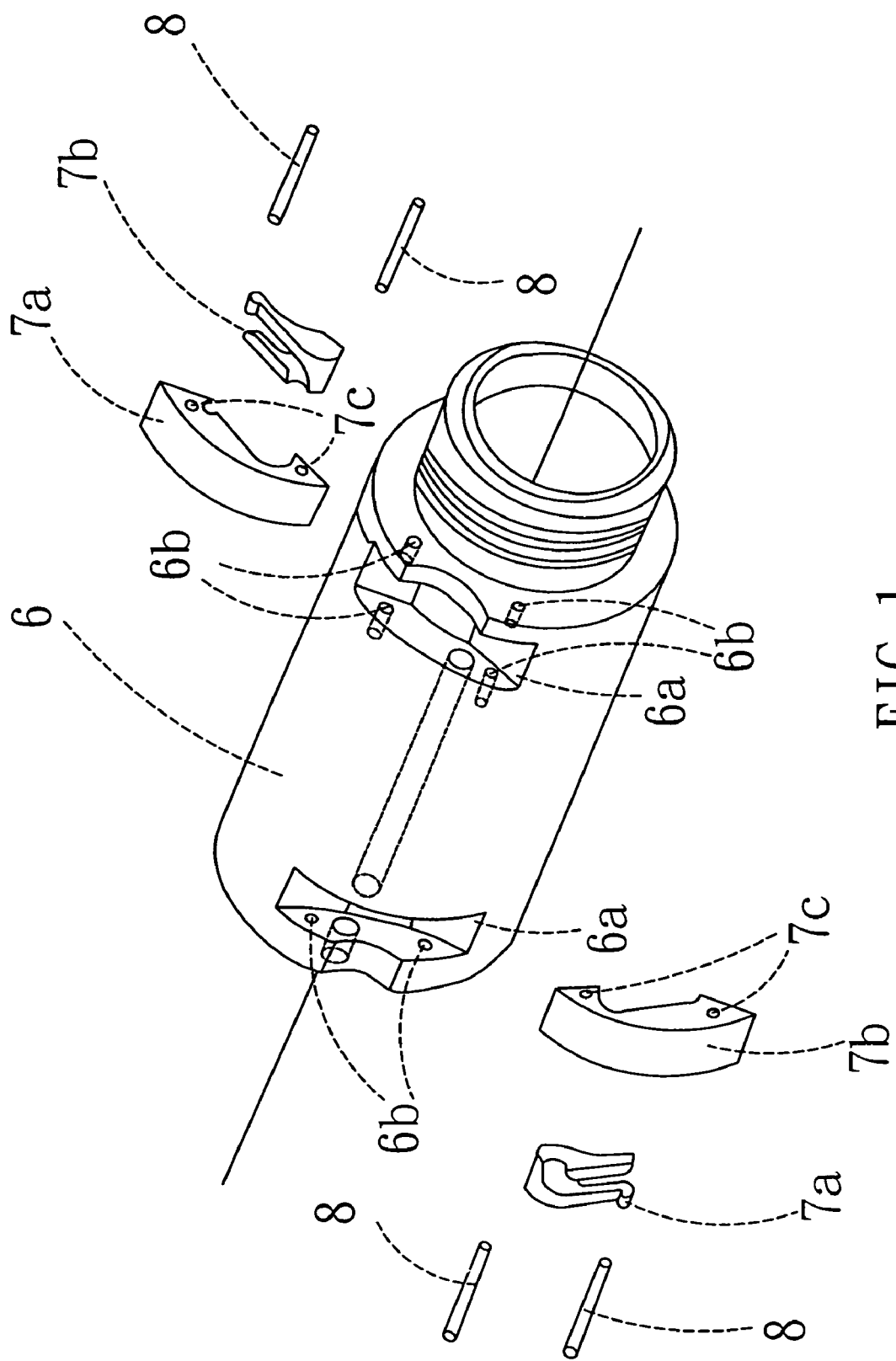
FIG. 1 is an exploded view of a conventional ball screw.
Figure 2:
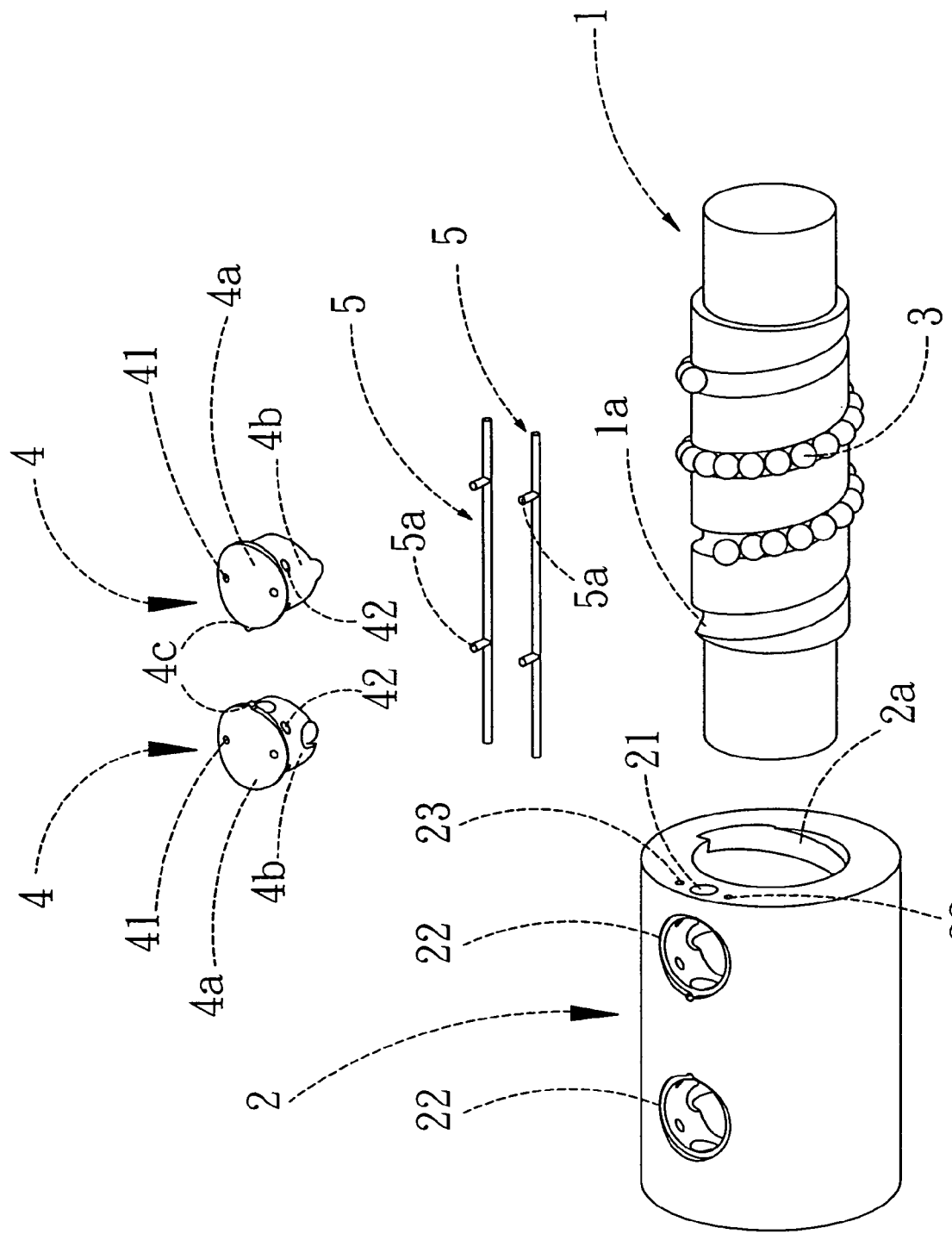
FIG. 2 is an exploded view of a ball screw assembly in accordance with the present invention.

Referring firstly to FIG. 2, which is an exploded view of a ball screw assembly in accordance with the present invention. The ball screw assembly comprises a screw shaft 1, a nut 2, a plurality of balls 3, two circulate components 4 and two fixing members 5.

A helical groove 1a is formed in the outer surface of the screw shaft 1 for engaging with the nut 2, two axial locking holes 23 and a circulating hole 21 are formed in an end surface of the nut 2. The nut 2 is hollow, and in its inner surface is formed a helical groove 2a located opposite the helical groove 1a of the screw shaft 1, thus forming a circulating path for the balls 3. The circulate components 4 are disposed in the nut 2 for enabling the balls 3 to roll endlessly in the circulating path.

The nut is defined with a plurality of circular holes for installation of the circulate component, and the circular holes are formed in an outer surface of the nut for insertion of the circulate components, at least one axial locking hole is formed in the nut, an axial hole and a radial hole are connected to each other and are formed in the circulate component, the axial hole of the circulate component is aligned to the axial locking hole of the nut, the circulate component is fixed in the nut by at least one locking member that is formed by injecting liquid resin into radial hole of the circulate component, so that the liquid flows to the axial hole of the circulate component and the axial locking hole of the nut, and forms the locking members after curing.

Figure 3:
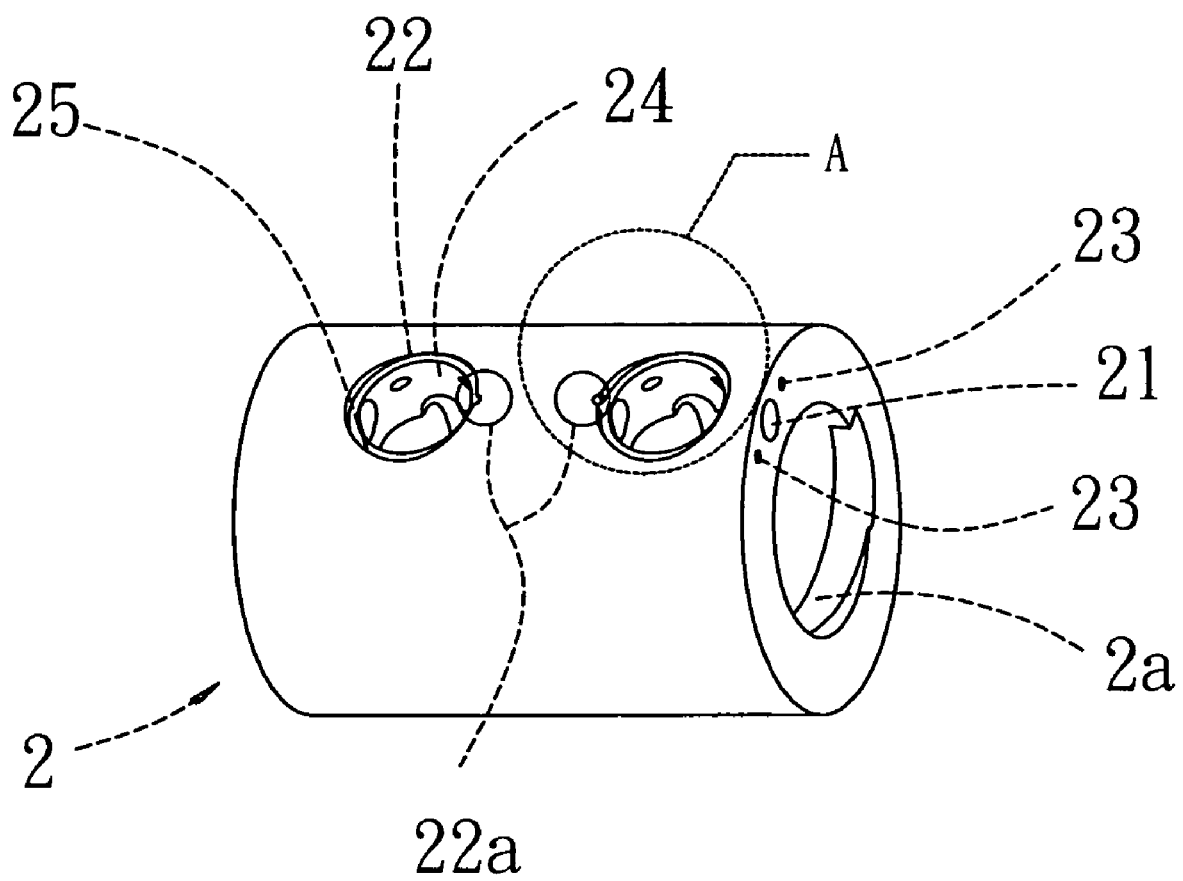
FIG. 3 is a perspective view of a nut in accordance with the present invention.

Referring to FIG. 3, which is a perspective view of a nut in accordance with the present invention. The circular holes 22 are formed in the outer surface of the nut, and each of the circular holes 22 is a stepped which hole has a lower portion 24 and an upper portion 25. The two axial locking holes 23 and the circulating hole 21 in the end surface of the nut 2 are connected to the lower portion 24 of the circular holes 22.

Figure 4:
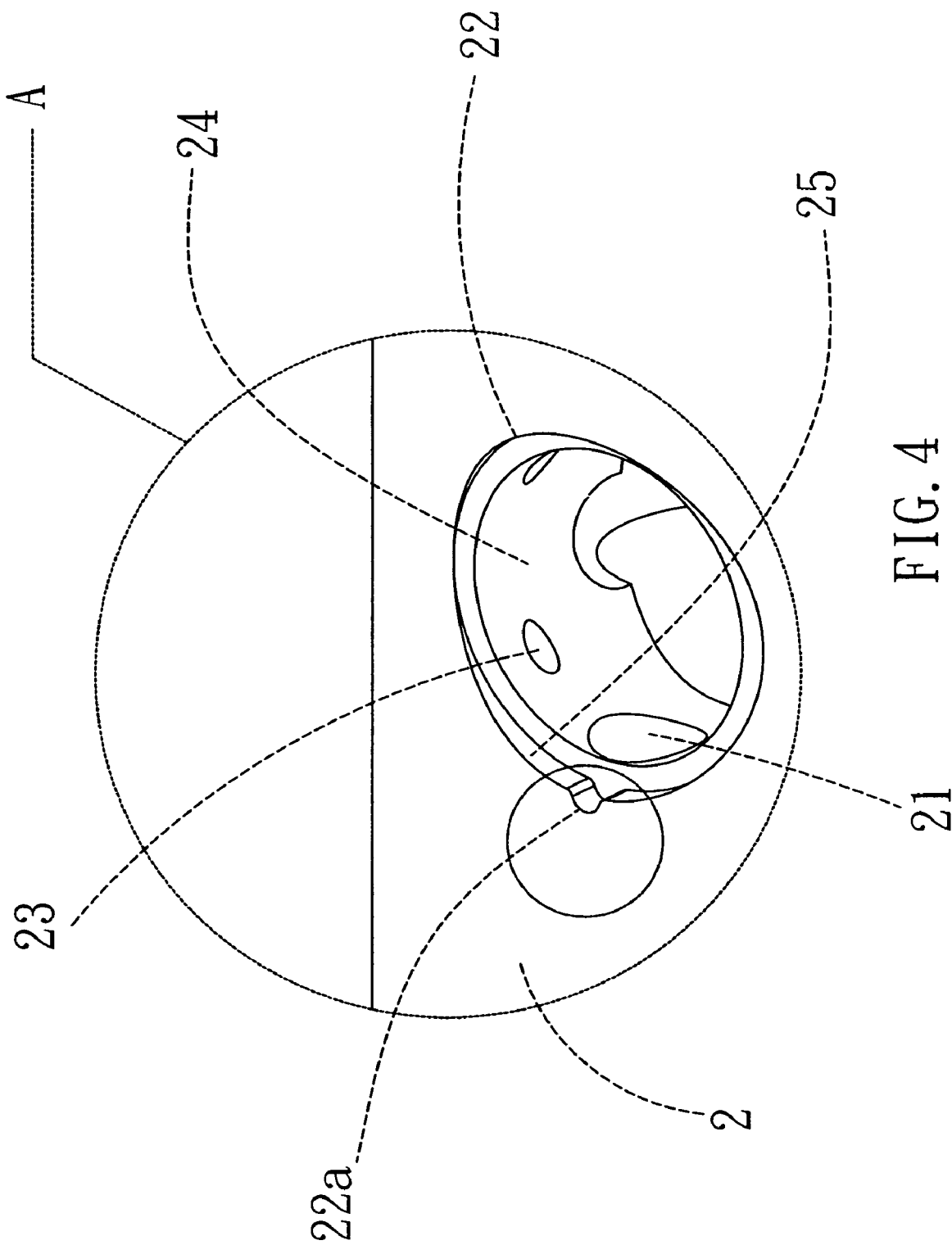
FIG. 4 is an enlarged view of showing the circular hole in the nut.

Referring then to FIG. 4, which is an amplified view of showing the circular hole. The diameter of the lower portion 24 of the circular hole 22 in the nut 2 circled by the dotted circular line A is smaller than the diameter of the upper portion 25. A notch 22a is formed in peripheral edge of the upper portion 25 of the circular hole 22.

Figure 5A:
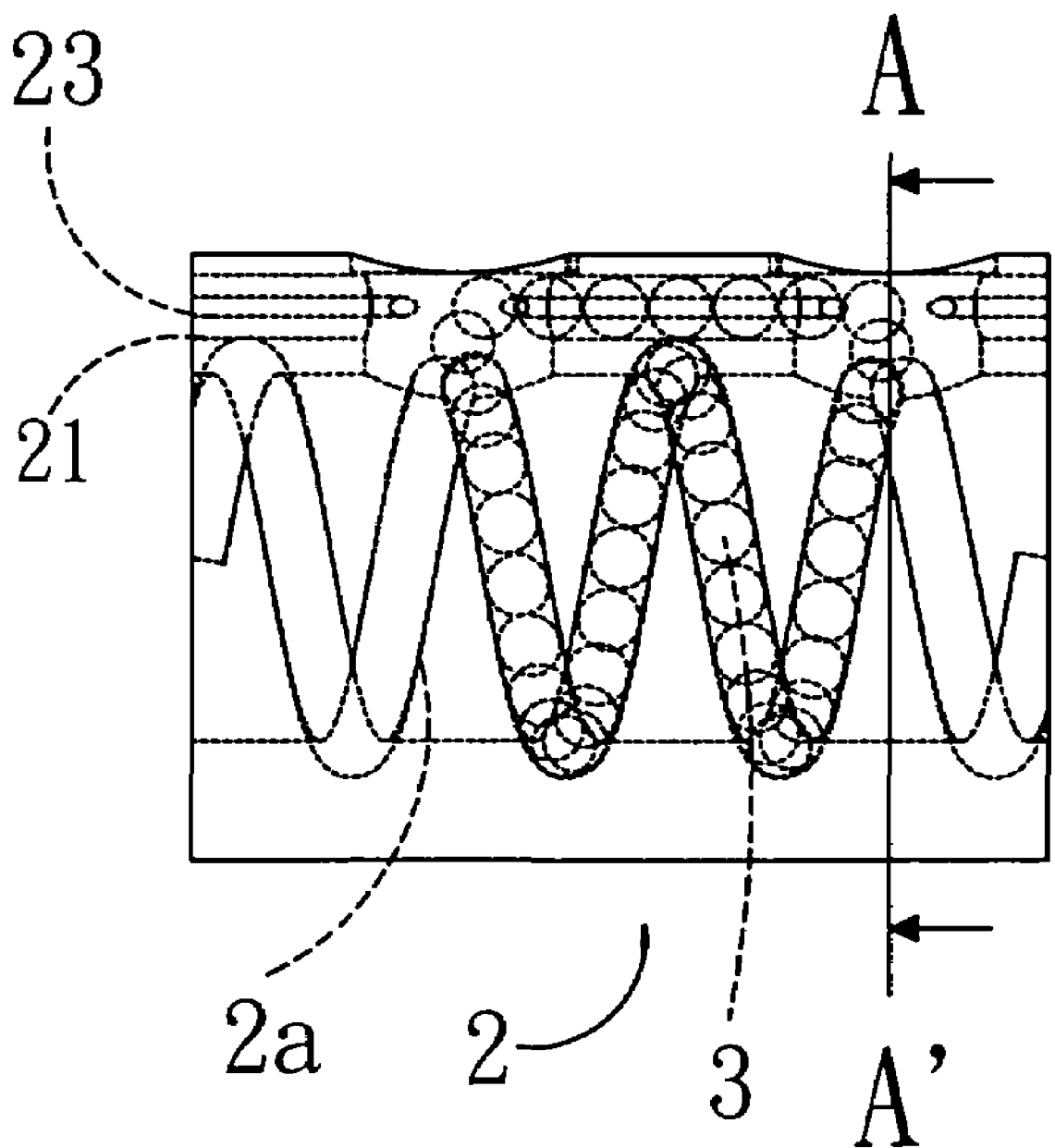
FIG. 5A is a perspective front view of the nut in accordance with the present invention.
Figure 5B:
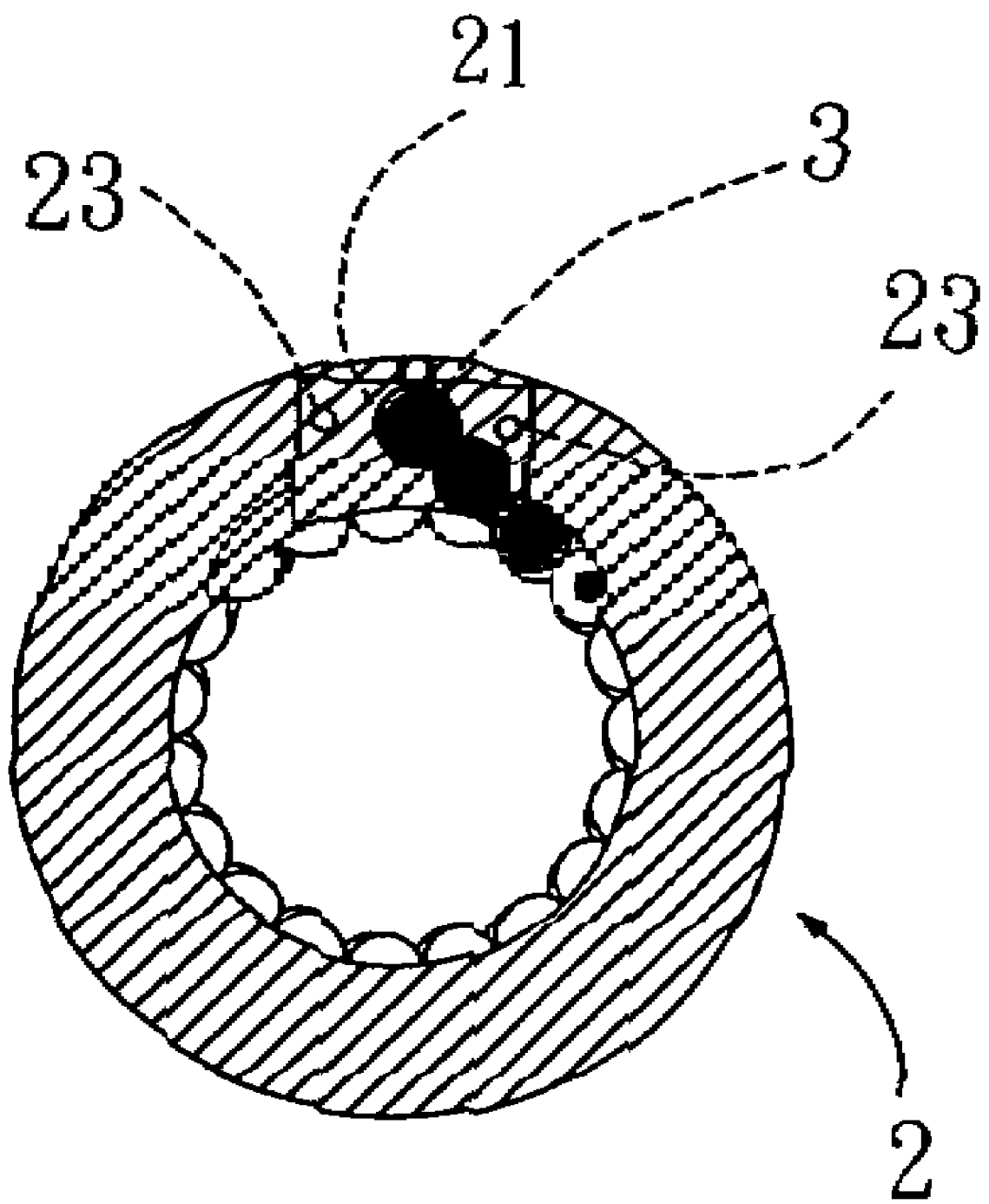
FIG. 5B is a cross sectional view taken along the line A-A' of FIG. 5A.

Referring to FIG. 5A, which is a perspective front view of the nut in accordance with the present invention. And FIG. 5B is a cross sectional view taken along the line A-A' of FIG. 5A. The cross sectional structure of the locking holes 23 and the circulating hole 21 of the nut 2 are clearly shown in the drawings. The balls 3 are received in the helical groove 2A and circulate within the circulating path.

Figure 6:
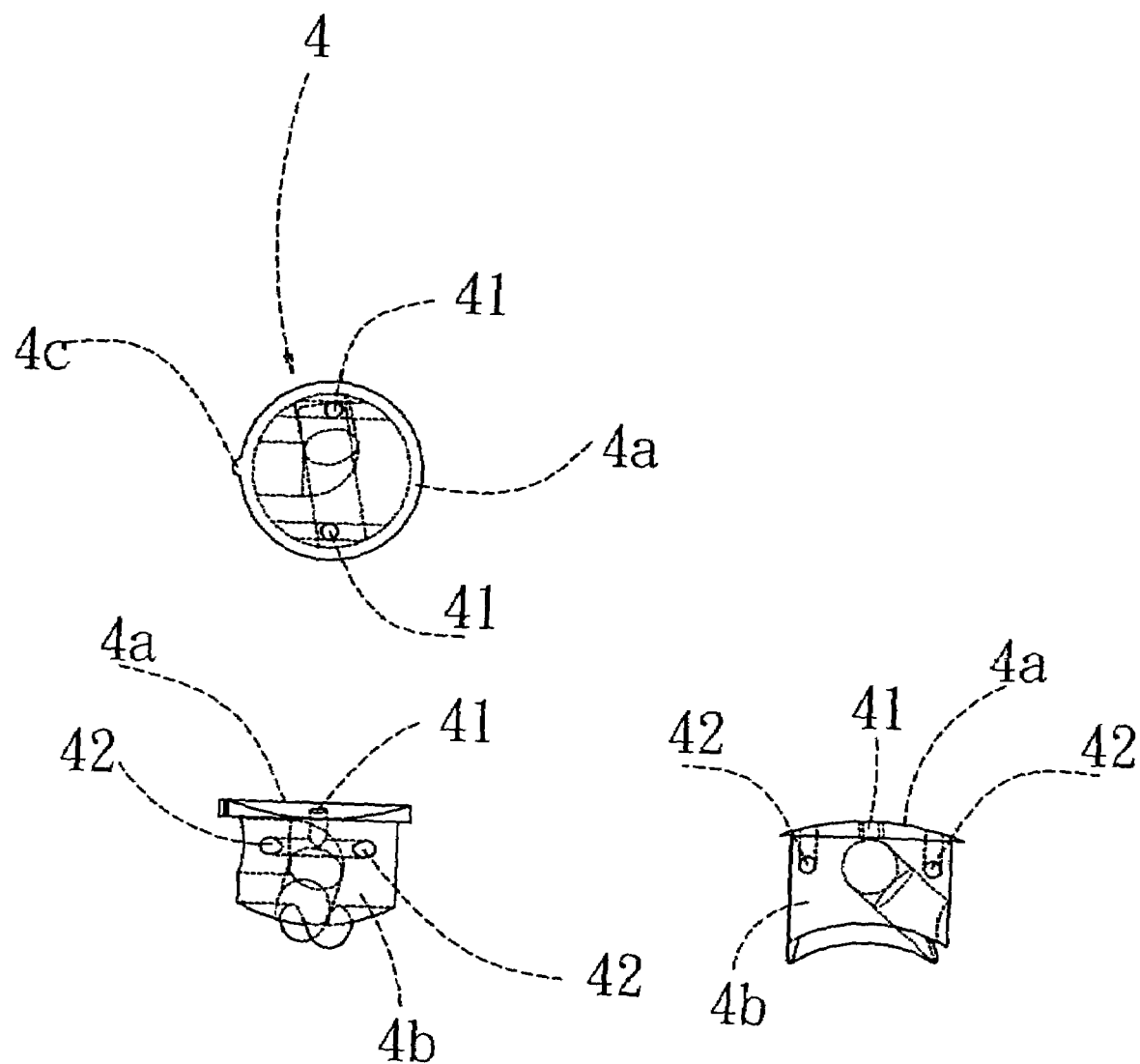
FIG. 6 shows the circulate component from different angle.

Referring to FIG. 6, which shows the circulate component from different angle. The axial hole 42 and the radial hole 41 are connected to each other and are formed in the top portion 4a and the bottom portion 4b of the circulate component 4, respectively. The top portion 4a of the circulate component 4 is formed with at least one protrusion 4c for engaging with the notch 22a in peripheral edge of the upper portion 25 of the circular hole 22, as shown in FIG. 4, and thus the circulate component 4 can be positioned more easily.

Figure 7:
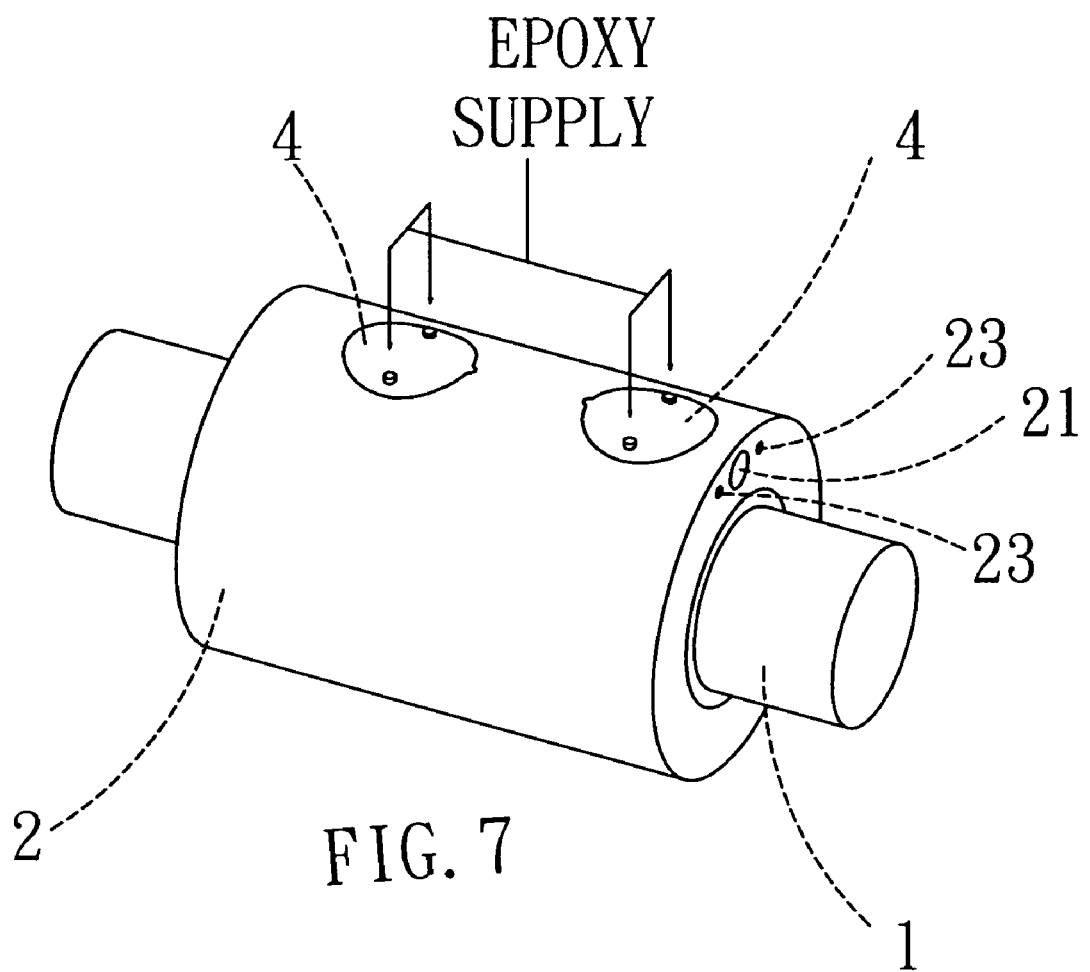
FIG. 7 is an assembly view of a ball screw assembly in accordance with the present invention.
Figure 8:
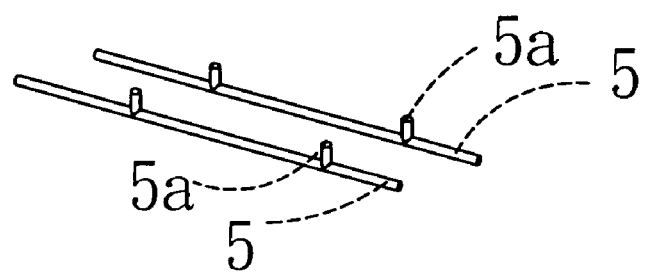
FIG. 8 shows the locking members in accordance with the present invention.

Referring to FIGS. 7 and 8, the circulate components 4 are assembled on the nut 2 by engaging the protrusion 4c of the circulate components 4 in the notch 22a of the nut 2, thus the circulate components 4 can be positioned easily.

The method of fixing the circulate components 4 in the nut 2 is that: the axial hole 42 and the radial hole 41 (as shown in FIG. 6) are connected to each other and are formed in the top portion 4a and the bottom portion 4b of each of the circulate components 4, respectively, the axial hole 42 of the circulate components 4 is aligned to the axial locking hole 23 of the nut 2 (as shown in FIG. 5), and then liquid resin is injected into the axial hole 42 of the circulate components 4 and the axial locking hole 23 of the nut 2, and the liquid resin will form the locking members 5 after curing. The locking members 5 each has vertical protrusions 5a that can fix the circulate components 4 in the nut 2.

Each of the locking members 5 is a solid pillared structure, its size is determined by the diameter of the hole in which the resin is injected. The liquid resin is liquid thermosetting plastic material or liquid thermoplastic material.

To summarize, the present invention improves the existing assembling method of the ball screw, and the innovation of this invention is the method of positioning and fixing the circulate component. The method makes assembly easier and improves interchangeability and commonality of the fixing member, thus improving assembly efficiency while reducing production cost. Furthermore, the assembly difficulty and the interchangeability of the fixing member can be solved simultaneously.

While we have shown and described various embodiments in accordance with the present invention, it should be clear to those skilled in the art that further embodiments may be made without departing from the scope of the present invention.

What is claimed is:

1. A ball screw assembly comprising: a screw shaft, a nut, a plurality of balls, at least one circulate component and at least one fixing member, a helical groove formed in an outer surface of the screw shaft for engaging with the nut, the nut is hollow, and in its inner surface is formed a helical groove located opposite the helical groove of the screw shaft, thus forming a circulating path for the balls, the circulate component is disposed in the nut for enabling the balls to circulate in the circulating path, the ball screw assembly is characterized in that:

the nut is defined with a plurality of circular holes for installation of the circulate component, and the circular holes are formed in an outer surface of the nut for insertion of the circulate components, at least one axial locking hole is formed in the nut, an axial hole and a radial hole are connected to each other and are formed in the circulate component, the axial hole of the circulate component is aligned to the axial locking hole of the nut, the circulate component is fixed in the nut by at least one locking member that is formed by injecting liquid resin into the radial hole of the circulate component, so that the liquid flows to the axial hole of the circulate component and the axial locking hole of the nut, and forms the locking members after curing.

2. The ball screw assembly as claimed in claim 1, wherein the circular hole is a stepped hole that has a lower portion and an upper portion, and the diameter of the lower portion is smaller than that of the upper portion.

3. The ball screw assembly as claimed in claim 2, wherein a notch is formed in a peripheral edge of the upper portion of the circular hole.

4. The ball screw assembly as claimed in claim 3, wherein a protrusion is formed on the top portion of the circulate component.

5. The ball screw assembly as claimed in claim 1, wherein there are two axial locking holes in the nut.

6. The ball screw assembly as claimed in claim 1, wherein there are two axial holes and two radial holes in the circulate component.

7. The ball screw assembly as claimed in claim 1, wherein the locking member is a solid pillared structure whose size is determined by the diameter of the hole in which the resin is injected.

8. The ball screw assembly as claimed in claim 1, wherein the locking member has at least a vertical protrusion.

9. The ball screw assembly as claimed in claim 1, wherein the liquid resin is liquid thermosetting plastic material or liquid thermoplastic material.

* * * * *